United States Patent

Obara

[11] Patent Number: 5,933,292
[45] Date of Patent: Aug. 3, 1999

[54] BEARING STRUCTURE FOR A HARD DISK DRIVE DEVICE

[75] Inventor: Rikuro Obara, Nagano-ken, Japan

[73] Assignee: Minebea Co., Ltd., Nagano-ken, Japan

[21] Appl. No.: 09/023,297

[22] Filed: Feb. 13, 1998

[30] Foreign Application Priority Data

Feb. 14, 1997 [JP] Japan .................................. 9-047125

[51] Int. Cl.$^6$ .................................................. G11B 17/02
[52] U.S. Cl. ........................................................ 360/99.08
[58] Field of Search .............................. 360/98.07, 99.08

[56] References Cited

U.S. PATENT DOCUMENTS

| 4,713,704 | 12/1987 | Voll | 360/99.08 |
| 5,045,738 | 9/1991 | Hishida | 360/99.08 |

Primary Examiner—A. J. Heinz
Attorney, Agent, or Firm—Lowe Hauptman Gopstein Gilman & Berner

[57] ABSTRACT

The object of the present invention is to provide a hard disk drive device including a compact enough double row bearing apparatus having a shaft of sufficient mechanical rigidity.

In accordance with the present invention, A hard disk drive device comprising a double row bearing apparatus, including a stepped shaft having larger and smaller diameter shaft portions, an inner race way groove provided on the outer peripheral surface of the larger diameter portion, balls interposed between the inner race way groove and an outer race way groove formed on an inner surface of an outer race surrounding the larger diameter portion, and a ball bearing including inner and outer races and balls interposed therebetween. The ball bearing is fitted at its inner race over the smaller diameter portion of the shaft, and the lower end of said larger diameter shaft portion of the double row bearing apparatus is installed and secured on a base of the hard disk drive device.

3 Claims, 2 Drawing Sheets

BEARING STRUCTURE FOR A HARD DISK DRIVE DEVICE

BACKGROUND OF THE INVENTION

1. Technical Field

The present invention relates to an improvement of a bearing portion of the motor of the hard disk drive device.

2. Description of the Prior Art

The hard disk drive device employs in general a motor such as a spindle motor for rotating magnetic disk means for storing data. The motor includes a shaft, a rotor, base, and stator. The rotor as rotating member is adapted to be journalled to extend vertically to the base by means of bearing means installed on the base.

The bearing apparatus of the prior art as shown in FIG. 4 comprises a pair of ball bearings 21, 22 fitted on a shaft 23. The bearings 21, 22 are spaced apart for example by means of spacer 24 secured on the shaft 23.

The major problem of the hard disk drive device is to reduce the size thereof. That is, it is desirable to make the rotor of the motor and the bearing means for supporting the rotor as small as possible.

The way which can be adapted to reduce the size of the bearing means is to miniaturize both ball bearings of the pair. However, this countermeasure leads to the reduction of the diameter of the shaft.

The shaft of reduced diameter provides a problem of reduced mechanical rigidity to impair the reliability and vibration-proof property of the hard disk drive device. Further, the shaft of reduced diameter becomes resonant with members of the hard disk drive device surrounding therearound e.g. the casing of the device. That is, the reduction of the resonance property will be accompanied by the reduction of the reliability of the hard disk drive device.

The object of the present invention is to provide a hard disk drive device including a compact enough double row bearing apparatus having a shaft of sufficient mechanical rigidity.

SUMMARY OF THE INVENTION

These and other objects are achieved by A hard disk drive device comprising a double row bearing apparatus, including a stepped shaft having larger and smaller diameter shaft portions, an inner race way groove provided on the outer peripheral surface of the larger diameter portion, balls interposed between the inner race way groove and an outer race way groove formed on an inner surface of an outer race surrounding the larger diameter portion, and a ball bearing including inner and outer races and balls interposed therebetween. The ball bearing is fitted at its inner race over the smaller diameter portion, and the lower end of said larger diameter shaft portion of the double row bearing apparatus is installed and secured on a base of the hard disk drive device. The hard disk drive device further comprises a cylindrical sleeve provide through a rotor of a motor for rotating magnetic disk means for storing data. The sleeve opening at its both upper and lower ends. The sleeve is provided on its inner surface with upper and lower larger inner diameter portions of the same diameter and a thick smaller inner diameter portion formed therebetween. The thick portion is clamped between the outer race provided around the larger diameter portion and fitted within the lower portion of the sleeve and the outer race of the ball bearing fitted within the upper portion of the sleeve, thus the rotor of the motor is assembled stationary to the double row bearing apparatus.

In the hard disk drive device according to the present invention, the cylindrical sleeve is formed integrally with the rotor.

The outer diameter of the inner race of the ball bearing is same as that of the larger diameter portion of the stepped shaft, the inner diameter of the outer race of the ball bearing is the same diameter as that of the outer race provided around the larger diameter portion, and the diameter of the balls of the ball bearing and the diameter of the balls interposed between the outer surface of the larger diameter portion and the outer race provided therearound are substantially equal.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

A preferred embodiment of a hard disk drive device in accordance with the present invention will now be described in detail with reference to the attached drawings.

The hard disk drive device of the present invention includes a motor M for rotating a magnetic disk 17 for storing data. A bearing apparatus for the motor M is constructed as a double row bearing apparatus of unique structure. The structure of the double row bearing apparatus will be described with reference to FIG. 3.

Figure 3:
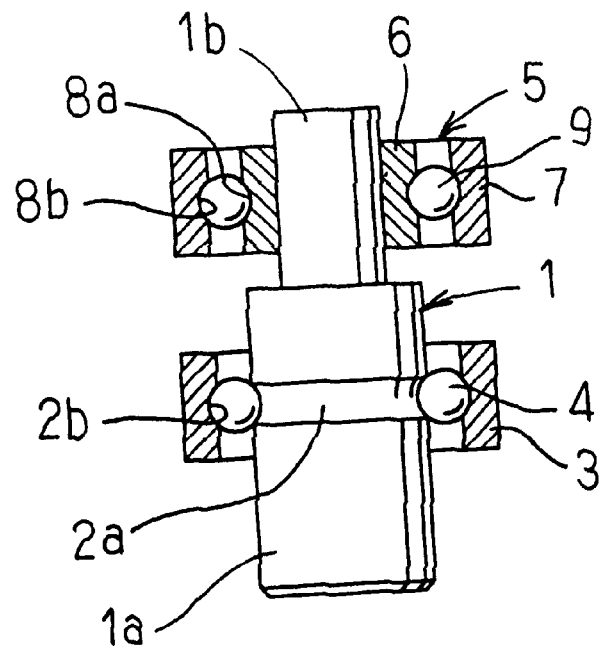
FIG. 3 is a longitudinal cross-sectional view of the double row bearing apparatus.
Figure 4:
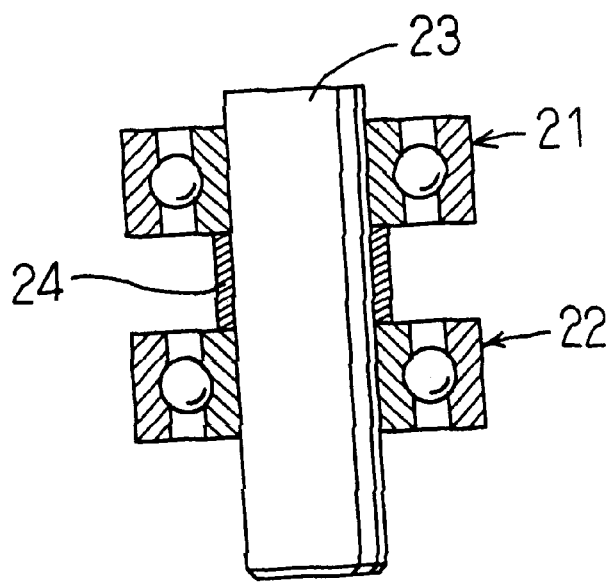
FIG. 4 is a longitudinal cross-sectional view of the bearing apparatus for the motor employed in the hard disk drive device of the prior art apparatus.

In FIG. 3, reference numeral 1 is added to a stepped shaft including a larger diameter shaft portion 1a around the outer peripheral surface thereof an inner race way groove 2a is provided, and smaller diameter shaft portion 1b.

Reference numeral 3 is added to an outer race provided around the larger diameter portion 1a. The outer race is formed on its inner peripheral surface with an outer race way groove 2b. A number of balls 4 are interposed between the inner and outer grooves 2a and 2b to provide one of the bearings of the double row bearing apparatus.

A ball bearing 5 is removably fitted with its inner race 6 on the smaller diameter portion 1b of the stepped shaft 1. The ball bearing 5 includes an inner race 6 having an inner race way groove 8a, an outer race 7 having an outer race way groove 8b, and a plurality of balls 9 interposed therebetween.

The outer diameter of inner race 6 of ball bearing 5 is made equal with the outer diameter of the larger diameter portion 1a of the stepped shaft 1. The inner and outer diameters of outer race 7 is same as those of outer race 3. In this connection, all of the balls 4 and 9 have the same diameter.

Figure 2:
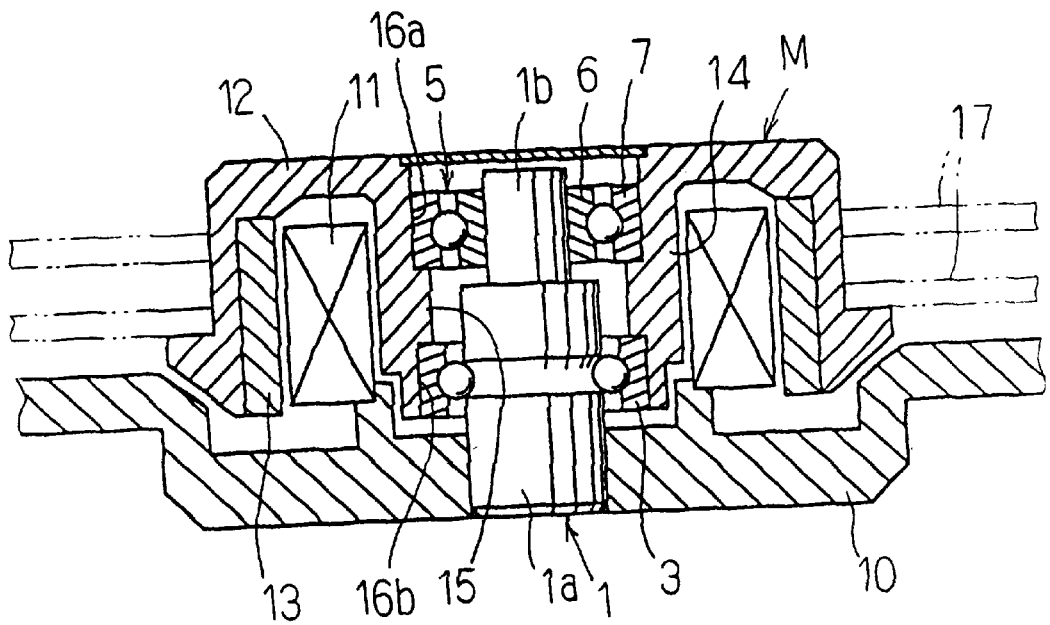
FIG. 2 is a longitudinal cross-sectional view of the motor employed in the hard disk drive device of the present invention.

The double row bearing apparatus is assembled on the base 10 as shown in FIG. 2. As can be seen in FIG. 2, the lower end of larger diameter portion 1a of shaft 1 is installed and secured on the base 10. A rotor 12 is adapted to be formed from a blank material by means for example of machining to have a cylindrical sleeve 14 therethrough.

The sleeve 14 is enlarged on both ends to form upwardly and downwardy opening upper and lower larger inner diameter portions 16a and 16b. These portions are separated with each other by a thick smaller inner diameter portion 15. The outer race 7 of the ball bearing 5 is adapted to be fitted within upper portions 16a and the outer race 3 provided around the larger portion of the shaft adapted to be fitted within the lower portions 16b. The thick portion 15 is adapted to be clamped between outer races 3 and 7 and secured therebetween.

Figure 1:
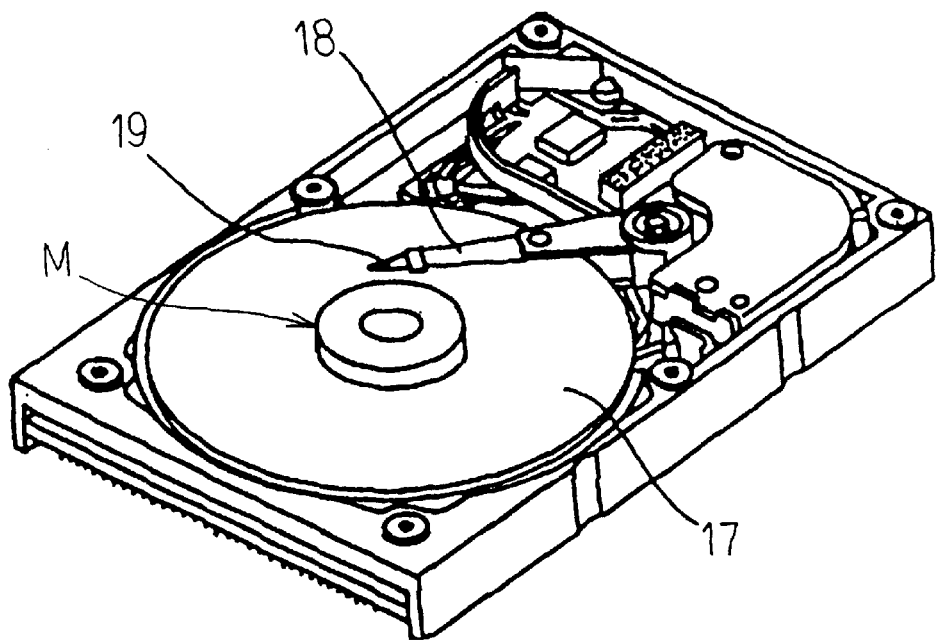
FIG. 1 is a perspective view of the hard disk drive device of the present invention.

The reference numeral 11 found in this figure is attached to a stator around which a coil is provided, and the reference numeral 13 is attached to magnet means installed on an inner peripheral surface of the rotor so as to be opposite to the stator. Further, in FIG. 1, the reference numeral 18 is attached to a swing arm including at its distal end a magnetic head 19 for reading and writing data to the magnetic disk 17.

In assembling the motor, a ball bearing 5 is removed from the double row bearing apparatus, then the lower end of larger diameter portion 1a of the shaft is secured on the base of the motor, and fit the lower portion 16b of sleeve 14 of rotor 12 over the outer race 3 provided around the larger diameter portion.

Subsequently, the ball bearing 5 is fitted into the space formed between the top end of smaller diameter portion 1b and sleeve 14 from the upper opening of the sleeve to clamp thick portion 15 of sleeve 14 between outer races 7 and 3.

The inner race 6 of the ball bearing is secured by means for example of adhesive to the smaller diameter portion 1b with applying proper pressure on the upper end surface of the inner race.

Although the balls 4 and 9 are same in their diameter in the above-mentioned embodiment, balls of different diameter can be used in some cases.

The hard disk drive apparatus in accordance with the present invention having a construction as mentioned above will provide following effects.

The double row bearing apparatus of the motor of the hard disk drive apparatus of the present invention includes an inner race way groove formed on the outer peripheral surface of the larger diameter shaft portion. In this connection, the inner race to be provided in the prior art apparatus around the shaft is no longer necessary. Further, the diameter of the shaft portion on which the inner race is to be provided in the prior art thereon can be increased to make it possible to provide the stopped shaft. Consequently, the diameter of the outer race of the bearing can be decreased without decreasing the mechanical rigidity of the shaft.

In conclusion, the double row bearing apparatus and rotor can be miniaturize without sacrificing the mechanical rigidity of the shaft, so that miniaturizing of the hard disk drive device can be obtained without reducing the reliability and vibration-proof property thereof.

The thick portion 15 of the cylindrical sleeve of the rotor can be clamped between the outer race provided around the larger diameter shaft portion and the outer race of the ball bearing while assembling the rotor on the double row bearing apparatus, since the ball bearing can be removed from the stepped shaft. In other words, the assembling operation can be effected easily.

Finally, only one ball bearing of the prior art structure is required so that the inner race required for the present invention is also only one. In addition, the thick portion of the sleeve functions as a spacer for spacing the upper and lower outer races. In this connection, it is not necessary to provide an additional spacer between outer races. Integrally forming the rotor and the cylindrical sleeve will reduce the number of parts of the apparatus.

While particular embodiment of the present invention have been illustrated and described, it should be obvious to those skilled in the art that various changes and modifications can be made without departing from the spirit and scope of the invention.

What is claimed is:

1. A hard disk drive device comprising a double row bearing apparatus, the apparatus including; a stepped shaft having larger and smaller diameter shaft portions, an inner race way groove provided on the outer peripheral surface of the larger diameter portion, balls interposed between the inner race way groove and an outer race way groove formed on an inner surface of an outer race surrounding the larger diameter portion, and a ball bearing including inner and outer races and balls interposed therebetween, wherein the ball bearing is fitted at its inner race over the smaller diameter portion, and the lower end of said larger diameter shaft portion of the double row bearing apparatus is installed and secured on a base; said hard disk drive device further comprising, a cylindrical sleeve provided through a rotor of a motor for rotating magnetic disk means for storing data, said sleeve opening at its both upper and lower ends, wherein said sleeve is provided on its inner surface with upper and lower larger inner diameter portions of the same diameter and a thick smaller inner diameter portion formed therebetween, and said thick portion is clamped between the outer race provided around the larger diameter portion and fitted within the lower portion of the sleeve and the outer race of the ball bearing fitted within the upper portion of the sleeve, thus the rotor of the motor is assembled stationary to the double row bearing apparatus.

2. The hard disk drive device according to claim 1, wherein the cylindrical sleeve is formed integrally with the rotor.

3. The hard disk drive device according to claim 1, wherein the outer diameter of the inner race of said ball bearing is same as that of the larger diameter portion of said stepped shaft, the inner diameter of the outer race of said ball bearing is same as that of the outer race provided around the larger diameter portion, and the diameter of the balls of said ball bearing is same as that of the balls interposed between the outer surface of the larger diameter portion and the outer race provided therearound.

\* \* \* \* \*